United States Patent
Li et al.

(10) Patent No.: US 11,249,880 B1
(45) Date of Patent: Feb. 15, 2022

(54) DEBUGGING AND SIMULATING APPLICATION RUNTIME EXECUTION

(71) Applicant: International Business Machines Corporation, Armonk, NY (US)

(72) Inventors: Chun Ling Li, Beijing (CN); Jing Chen, Beijing (CN); Wei Jiang, Beijing (CN); Xiaopeng Zhang, Beijing (CN); Yun Wang, Beijing (CN); Zhen Liu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/346,837

(22) Filed: Jun. 14, 2021

(51) Int. Cl.
*G06F 9/44* (2018.01)
*G06F 11/36* (2006.01)
*G06F 11/34* (2006.01)

(52) U.S. Cl.
CPC ...... *G06F 11/3624* (2013.01); *G06F 11/3476* (2013.01); *G06F 11/3636* (2013.01)

(58) Field of Classification Search
None
See application file for complete search history.

(56) References Cited

U.S. PATENT DOCUMENTS

| | | | |
|---|---|---|---|
| 8,136,096 B1 | 3/2012 | Lindahl | |
| 8,595,690 B2 * | 11/2013 | Moore | G06F 8/35 717/106 |
| 2013/0097584 A1 * | 4/2013 | Ayash | G06F 8/76 717/121 |
| 2013/0132048 A1 * | 5/2013 | Yamamoto | G06F 11/368 703/2 |
| 2015/0355998 A1 * | 12/2015 | Kogan-Katz | G06F 8/71 717/101 |
| 2021/0200740 A1 * | 7/2021 | Sterngold | G06F 11/3476 |
| 2021/0303440 A1 * | 9/2021 | Rodgers | G06F 11/364 |

OTHER PUBLICATIONS

"A method to do log-code fast mapping and track", An IP.com Prior Art Database Technical Disclosure, IP.com No. IPCOM000209096D, Jul. 28, 2011, 6 pages, <https://priorart.ip.com/IPCOM/000209096>.

(Continued)

*Primary Examiner* — Qamrun Nahar
(74) *Attorney, Agent, or Firm* — Sonny Z. Zhan

(57) ABSTRACT

In an approach for debugging and simulating application runtime execution, a processor loads source code and logs into a debug tool. A processor generates log debug information including a log map, a log variable cross reference table, and a method call stack tree. A processor determines a plurality of log blocks based on log context in the logs and the method call stack tree. A processor maps the source code to the logs for each log block. A processor suggests a starting point and a breakpoint based on the log variable cross reference table and the log blocks. A processor compares a source code variable value to a log variable value and a source code execution path to a log execution path based on the mapping set between the source code and the logs. A processor simulates the source code variable value with the log variable value.

20 Claims, 9 Drawing Sheets

(56) References Cited

OTHER PUBLICATIONS

"Automatically link log file collected from compiled project and enable playback and variable resolving", An IP.com Prior Art Database Technical Disclosure, IP.com No. IPCOM000252196D, Dec. 21, 2017, 4 pages, <https://priorart.ip.com/IPCOM/000252196>.

"How to debug Java errors", Rollbar, Printed Feb. 4, 2021, 13 pages, <https://rollbar.com/guides/how-to-debug-java/>.

"Trace Log Playback Apparatus", An IP.com Prior Art Database Technical Disclosure, IP.com No. IPCOM000232458D, Nov. 11, 2013, 3 pages, <https://priorart.ip.com/IPCOM/000232458>.

"Using Sentry", Expo Documentation, Printed Feb. 4, 2021, 1 page, <https://docs.expo.io/guides/using-sentry/>.

* cited by examiner

100
DEBUGGING AND SIMULATING APPLICATION RUNTIME EXECUTION

BACKGROUND

The present disclosure relates generally to the field of software debugging, and more particularly to debugging and simulating an application runtime execution by associating source code with logs.

In computer programming and software development, debugging is the process of finding and resolving bugs (i.e., defects or problems that prevent correct operation) within computer programs, software, or systems. Debugging tactics can involve interactive debugging, control flow analysis, unit testing, integration testing, log file analysis, monitoring at the application or system level, memory dumps, and profiling. Many programming languages and software development tools also offer programs to aid in debugging, known as debuggers.

SUMMARY

Aspects of an embodiment of the present disclosure disclose an approach for debugging and simulating application runtime execution. A processor loads source code and logs into a debug tool. A processor generates log debug information including a log map, a log variable cross reference table, and a method call stack tree. A processor determines a plurality of log blocks based on log context in the logs and the method call stack tree. A processor maps the source code to the logs for each log block. A processor suggests a starting point and a breakpoint based on the log variable cross reference table and the log blocks. A processor compares a source code variable value to a log variable value and a source code execution path to a log execution path based on the mapping set between the source code and the logs. A processor simulates the source code variable value with the log variable value.

DETAILED DESCRIPTION

Figure 1:
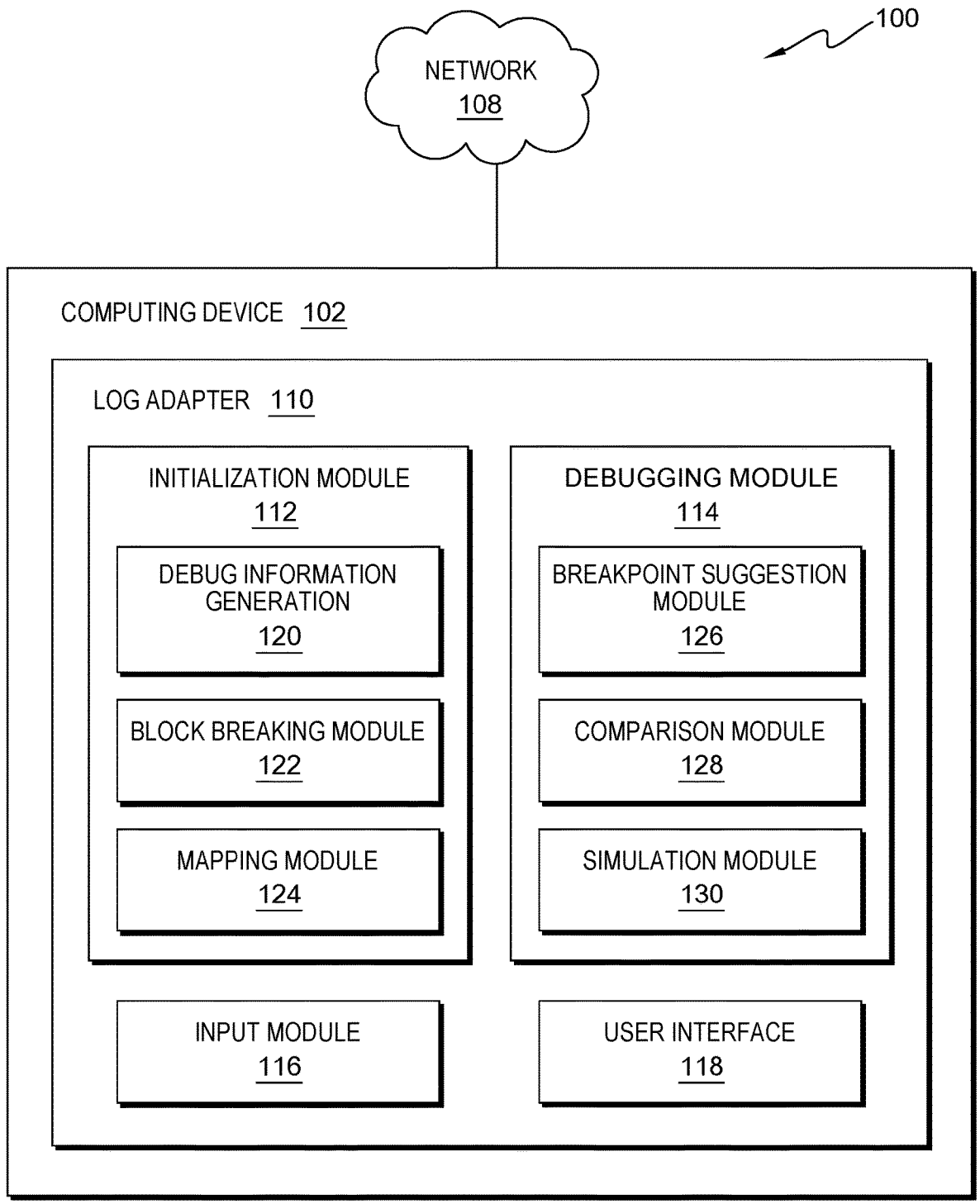
FIG. 1 is a functional block diagram illustrating a log debug environment, in accordance with an embodiment of the present disclosure.

The present disclosure is directed to systems and methods for debugging and simulating application runtime execution by associating source code with logs.

Embodiments of the present disclosure recognize a need for finding out a root cause with massive log data collected from an application customer user. For example, when dealing with an issue of an application in a customer environment, an application developer often needs to ask the customer to perform operations to reproduce the issue and collect log data. After the developer receives the log data, it can be difficult for the developer to find out the root cause with the massive log data as sometimes the developer cannot reproduce the issue in a local environment. Embodiments of the present disclosure recognize a need for simulating a customer's environment to reproduce issues for a developer to know what exactly happened in the customer's application runtime execution. Embodiments of the present disclosure recognize a need for comparing application execution between the customer's environment and developer's environment to find out the difference which probably leads to the root cause.

Embodiments of the present disclosure debugging and simulating the software runtime execution by associating logs with source code. Embodiments of the present disclosure adding a log adapter in an application log component to format log messages and log caller information, e.g., a caller's file name, a method name, a code line number in log data. Embodiments of the present disclosure disclose formatting the log data, associating logs with source code by a caller file name and code line information to identify runtime source code paths, and generating a mapping set between code lines and logs. Embodiments of the present disclosure disclose extracting variable values from log messages according to code lines. Embodiments of the present disclosure disclose building a mapping set between source code lines and log lines with variable values. Embodiments of the present disclosure disclose simulating the source code execution with log messages side by side on a user interface and with corresponding variable values.

Embodiments of the present disclosure disclose linking the source code to the logs in a user interface side by side with context variables from the logs. Embodiments of the present disclosure disclose that a developer may debug the source code with same operations as a customer does in the customer's environment. For example, during the debug process, the developer may compare the debug process code paths and variables with the code paths and variables from the logs. The developer may set a break, when there is a difference, e.g., different variable execution paths or values, for the developer to track and may obtain variable values from logs to reproduce issues in the customer's environment.

Embodiments of the present disclosure disclose adding a log extension in an application logging component of a debug tool to format log messages and log caller information. Embodiments of the present disclosure disclose loading the corresponding source code into the debug tool. Embodiments of the present disclosure disclose generating a log map by lines, a log variables cross reference table, and a method call stack tree during a compiling process. Embodiments of the present disclosure disclose loading logs associated with source code into the debug tool. Embodiments of the present disclosure disclose breaking logs into blocks via log context and a method call stack tree. Embodiments of the present disclosure disclose associating logs with a log map by lines. Embodiments of the present disclosure disclose extracting log variable values. Embodiments of the present disclosure disclose generating a code and log mapping set.

The present disclosure will now be described in detail with reference to the Figures. FIG. 1 is a functional block diagram illustrating a log debug environment, generally designated 100, in accordance with an embodiment of the present disclosure.

In the depicted embodiment, log debug environment 100 includes computing device 102 and network 108. In various embodiments of the present disclosure, computing device 102 can be a laptop computer, a tablet computer, a netbook computer, a personal computer (PC), a desktop computer, a mobile phone, a smartphone, a smart watch, a wearable computing device, a personal digital assistant (PDA), or a server. In another embodiment, computing device 102 represents a computing system utilizing clustered computers and components to act as a single pool of seamless resources. In other embodiments, computing device 102 may represent a server computing system utilizing multiple computers as a server system, such as in a cloud computing environment. In general, computing device 102 can be any computing device or a combination of devices with access to log adapter 110 and network 108 and is capable of processing program instructions and executing log adapter 110, in accordance with an embodiment of the present disclosure. Computing device 102 may include internal and external hardware components, as depicted and described in further detail with respect to FIG. 9.

Further, in the depicted embodiment, computing device 102 includes log adapter 110. In the depicted embodiment, log adapter 110 is located on computing device 102. However, in other embodiments, log adapter 110 may be located externally and accessed through a communication network such as network 108. The communication network can be, for example, a local area network (LAN), a wide area network (WAN) such as the Internet, or a combination of the two, and may include wired, wireless, fiber optic or any other connection known in the art. In general, the communication network can be any combination of connections and protocols that will support communications between computing device 102 and log adapter 110, in accordance with a desired embodiment of the disclosure.

In the depicted embodiment, log adapter 110 includes initialization module 112, debugging module 114, input module 116, and user interface 118. In the depicted embodiment, initialization module 112, debugging module 114, input module 116, and user interface 118 are located on log adapter 110 and computing device 102. However, in other embodiments, initialization module 112, debugging module 114, input module 116, and user interface 118 may be located externally and accessed through a communication network such as network 108.

In one or more embodiments, log adapter 110 is configured to load a source code file and a log file into a debug tool. The log file is associated with the source code file. In an example, the log file may be a file that records either events that occur in an operating system or other software runs (e.g., the source code file), or messages between different users of a communication software. The log file may include logs. The source code file may include various source code for a software application. Log adapter 110 may receive the source code and the logs through input module 116. The logs may be from a customer's application runtime execution environment when executing the source code. Log adapter 110 may format the log messages and log caller information, e.g., a caller file name, a method name, a log line etc. Log adapter 110 may receive a pre-defined log rule or pattern. Log adapter 110 may format the log messages and log caller information according to the pre-defined rule or pattern by a user. Log adapter 110 may associate the logs with the source code by the caller file name, the method name, and the log lines. Log adapter 110 may extract variable values per log messages according to code lines. Log adapter 110 may build a map set between source code lines and log lines with variable values. Log adapter 110 may simulate the source code execution with log messages side by side on user interface 118, and with corresponding variable values.

In an example, log adapter 110 may find out a root cause with massive log data collected from an application customer user. For example, when dealing with an issue of an application in a customer environment, an application developer may need to ask the customer to perform operations to reproduce the issue and collect log data. After the developer receives the log data, it can be difficult for the developer to find out the root cause with the massive log data as sometimes the developer cannot reproduce the issue in a local environment. Log adapter 110 may simulate the software runtime execution by associating the logs with the source code. Log adapter 110 may format the logs and associate the logs with the source code by a caller file name and code line information to identify runtime source code paths.

In one or more embodiments, log adapter 110 is configured to generate log debug information including a log map, a log variable cross reference table, and a method call stack tree, based on the source code received, during a compiling process. Log adapter 110 may generate the log map by lines, e.g., a line mapping table for the log source lines specifically. Log adapter 110 may generate a log variable cross reference table. The log variable cross reference table may include cross reference information for variables in the log source lines. Log adapter 110 may generate a method call stack tree. The method call stack tree may represent the method calls in the source code. Log adapter 110 may generate a mapping set between the source code lines and the logs. Log adapter 110 may generate the log map by lines, the log variables cross reference table, and the method call stack tree during the compiling process.

In one or more embodiments, log adapter 110 is configured to determine a plurality of log blocks based on log context in the logs and a method call stack tree. Log adapter 110 may identify the plurality of log blocks based on the log context and the method call stack tree. Log adapter 110 may divide the log blocks into separate blocks based on log context in each block. Log adapter 110 may break the logs into blocks via the log context and source code call stack to easily find the starting point and narrow down the log scope. Log adapter 110 may break the logs into blocks via log context and the method call stack tree. Log adapter 110 may divide logs into blocks by independent operations implemented in the source code. Log adapter 110 may break the logs into different blocks which may represent different operations. Log adapter 110 may simulate the inputs that map the variable values in the block. For each block, the operation can be interactive, for example, a click on the button of a web page.

In one or more embodiments, log adapter 110 is configured to map the source code to the logs for each log block. Log adapter 110 may generate a mapping set with the log blocks. Log adapter 110 may build the mapping set between source code lines and log lines with variable values. For example, log adapter 110 may map from source code to a log mapping set, e.g., from a source file name, a method, and a source code line to a log index. In another example, log adapter 110 may map from a log index to a timestamp, a variable value, and a message with a source file name, a method, and a source code line.

In one or more embodiments, log adapter 110 is configured to suggest a starting point and a breakpoint based on the log variable cross reference table and the log blocks. Log adapter 110 may present the suggestion of the starting point and the breakpoint based on the log variable cross reference table and the log blocks to a user. For example, when a developer specifies a log block to debug, log adapter 110 may provide a suggestion of some starting points and breakpoints to debug. The developer may confirm the starting points and set the breakpoints accordingly.

In one or more embodiments, log adapter 110 is configured to compare a source code variable value to a log variable value based on the mapping set between the source code and the logs. Log adapter 110 may compare a debug process path with variables to an execution path with variables from the logs. Log adapter 110 may set a breakpoint intelligently when there is a difference between execution paths or variable values. Log adapter 110 may link source code and logs in user interface 118 side by side with context variables from logs. The developer may know exactly what happened in the customer's runtime environment accordingly. Log adapter 110 may extract variable values from log messages according to code lines.

In one or more embodiments, log adapter 110 is configured to simulate a source code variable value with a log variable value. Log adapter 110 may intelligently debug the source code by comparing the debug process paths and variables with the execution paths and variables from the logs. Log adapter 110 may automatically simulate with variable values from the logs to reproduce the issue. Log adapter 110 may use the variables values from the logs for current debugging context. Log adapter 110 may simulate a customer's environment to reproduce issues for a developer to know what exactly happened in the customer's application runtime execution. Log adapter 110 may compare an application execution between the customer's environment and developer's environment to find out the difference which probably leads to the root cause. Log adapter 110 may simulate the source code execution with log messages side by side on user interface 118 and with corresponding variable values. Log adapter 110 may link the source code to the logs in user interface 118 side by side with context variables from the logs. A developer may debug the source code with same operations as a customer does in the customer's environment. For example, during the debug process, the developer may compare the debug process code paths and variables with the code paths and variables from the logs. The developer may set a break, when there is a difference, e.g., different variable execution paths or values, for the developer to track and may obtain variable values from logs to reproduce issues in the customer's environment.

In the depicted embodiment, log adapter 110 includes initialization module 112, debugging module 114, input module 116, and user interface 118. In one or more embodiments, input module 116 is configured to load a source code file and a log file into a debug tool. The log file is associated with the source code file. In an example, the log file may be a file that records either events that occur in an operating system or other software runs (e.g., the source code file), or messages between different users of a communication software. The log file may include logs. The source code file may include various source code for a software application. Input module 116 may receive the source code and the logs. The logs may be from a customer's application runtime execution environment when executing the source code. Input module 116 may format the log messages and log caller information, e.g., a caller file name, a method name, a log line etc. Input module 116 may receive a pre-defined log rule or pattern. Input module 116 may format the log messages and log caller information according to a pre-defined rule or pattern by a user. Input module 116 may associate the logs with the source code by the caller file name, the method name, and the log lines.

In the depicted embodiment, initialization module 112 includes debug information generation 120, block breaking module 122, and mapping module 124. In one or more embodiments, debug information generation 120 is configured to generate log debug information including a log map, a log variable cross reference table, and a method call stack tree, based on the source code received, during a compiling process. Debug information generation 120 may generate the log map by lines, e.g., a line mapping table for the log source lines specifically. Debug information generation 120 may generate a log variable cross reference table. The log variable cross reference table may include cross reference information for variables in the log source lines. Debug information generation 120 may generate a method call stack tree. The method call stack tree may represent the method calls in the source code. Debug information generation 120 may generate a mapping set between the source code lines and the logs. Debug information generation 120 may generate the log map by lines, the log variables cross reference table, and the method call stack tree during a compiling process.

In one or more embodiments, block breaking module 122 is configured to determine a plurality of log blocks based on log context in the logs and the method call stack tree. Block breaking module 122 may identify the plurality of log blocks based on the log context and the method call stack tree. Block breaking module 122 may divide the log blocks into separate blocks based on a same log context in each block. Block breaking module 122 may break the logs into blocks via the log context and source code call stack to easily find the starting point and narrow down the log scope. Block breaking module 122 may break the logs into blocks via log context and a method call stack tree. Block breaking module 122 may divide logs into blocks by independent operations implemented in the source code. Block breaking module 122 may break the logs into different blocks which may represent different operations.

In one or more embodiments, mapping module 124 is configured to map the source code to the logs for each log block. Mapping module 124 may generate a mapping set with the log blocks. Mapping module 124 may build the mapping set between source code lines and log lines with variable values. For example, mapping module 124 may map from source code to a log mapping set, e.g., from a source file name, a method, and a source code line to a log index. In another example, mapping module 124 may map from a log index to a timestamp, a variable value, and a message with a source file name, a method, and a source code line.

In the depicted embodiment, debugging module 112 includes breakpoint suggestion module 126, comparison module 128, and simulation module 130. In one or more embodiments, breakpoint suggestion module 126 is configured to suggest a starting point and a breakpoint based on the log variable cross reference table and the log blocks. Breakpoint suggestion module 126 may present the suggestion of the starting point and the breakpoint based on the log variable cross reference table and the log blocks to a user. For example, when a developer specifies a log block to debug, breakpoint suggestion module 126 may provide a suggestion of some starting points and breakpoints to debug. The developer may confirm the starting points and set the breakpoints accordingly.

In one or more embodiments, comparison module 128 is configured to compare a source code variable value to a log variable value based on the mapping set between the source code and the logs. Comparison module 128 may compare a debug process path with variables to an execution path with variables from the logs. Comparison module 128 may set a breakpoint intelligently when there is a difference between variable execution paths or values. Comparison module 128 may link source code and logs in user interface 118 side by side with context variables from logs. The developer may know exactly what happened in the customer's runtime environment accordingly. Comparison module 128 may extract variable values from log messages according to code lines.

In one or more embodiments, simulation module 130 is configured to simulate a source code variable value with a log variable value. Simulation module 130 may intelligently debug the source code by comparing the debug process paths and variables with the execution paths and variables from the logs. Simulation module 130 may automatically simulate with variable values from the logs to reproduce the issue. Simulation module 130 may use the variables values from the logs for current debugging context. Simulation module 130 may simulate a customer's environment to reproduce issues for a developer to know what exactly happened in the customer's application runtime execution. Simulation module 130 may compare an application execution between the customer's environment and developer's environment to find out the difference which probably leads to the root cause. Simulation module 130 may simulate the source code execution with log messages side by side on user interface 118 and with corresponding variable values. Simulation module 130 may link the source code to the logs in user interface 118 side by side with context variables from the logs. A developer may debug the source code with same operations as a customer does in the customer's environment. For example, during the debug process, the developer may compare the debug process code paths and variables with the code paths and variables from the logs. The developer may set a break, when there is a difference, e.g., different variable execution paths or values, for the developer to track and may obtain variable values from logs to reproduce issues in the customer's environment.

Figure 2:
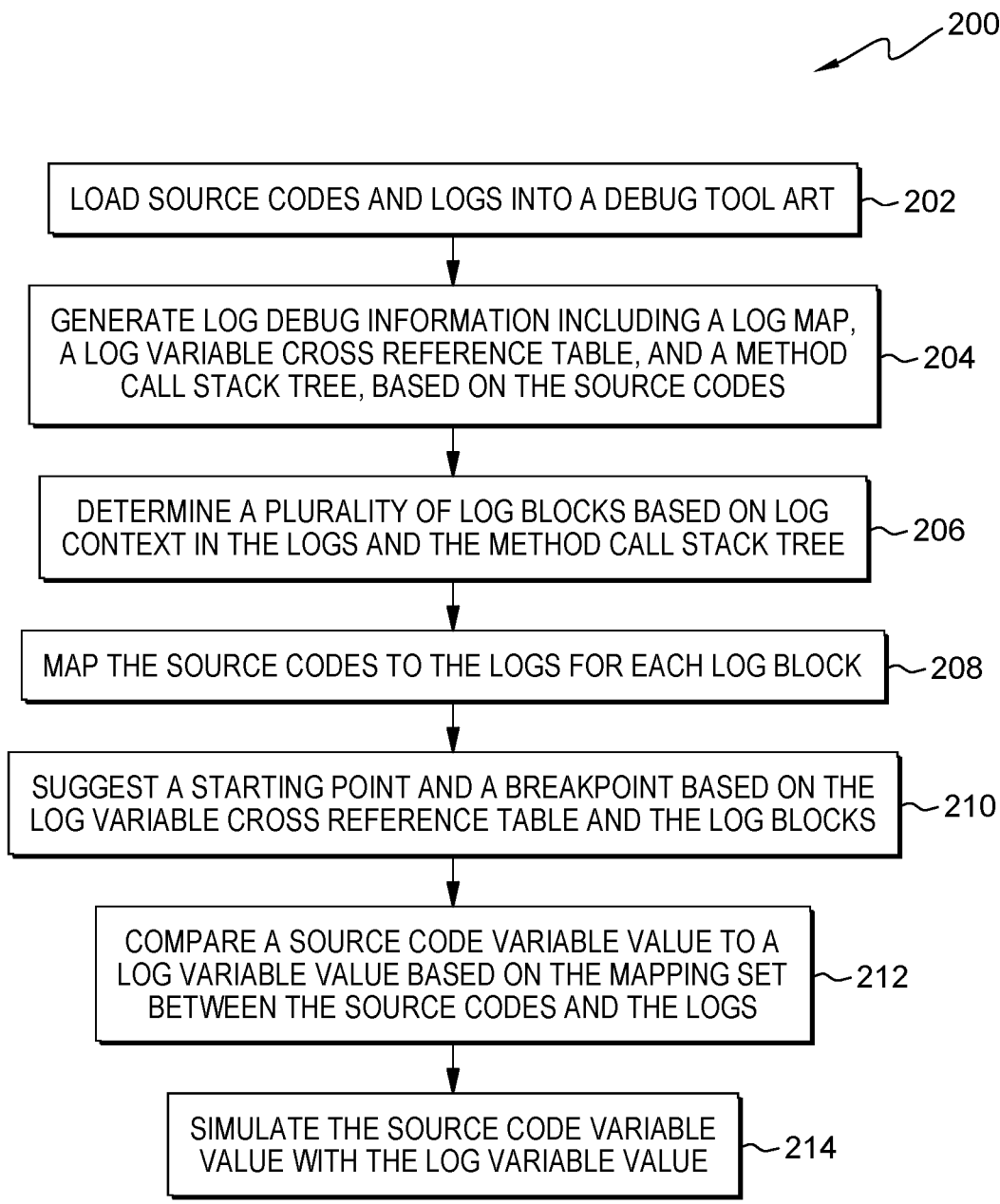
FIG. 2 is a flowchart depicting operational steps of a log adapter within a computing device of FIG. 1, in accordance with an embodiment of the present disclosure.

FIG. 2 is a flowchart 200 depicting operational steps of log adapter 110 in accordance with an embodiment of the present disclosure.

Log adapter 110 operates to load source code and logs into a debug tool. The logs are associated with the source code. Log adapter 110 also operates to generate log debug information including a log map, a log variable cross reference table, and a method call stack tree, based on the source code. Log adapter 110 also operates to determine a plurality of log blocks based on log context in the logs and the method call stack tree. Log adapter 110 operates to map the source code to the logs for each log block. Log adapter 110 operates to suggest a starting point and a breakpoint based on the log variable cross reference table and the log blocks. Log adapter 110 operates to compare a source code variable value to a log variable value based on the mapping set between the source code and the logs. Log adapter 110 operates to simulate the source code variable value with the log variable value.

In step 202, log adapter 110 loads a source code file and a log file into a debug tool. The log file is associated with the source code file. In an example, the log file may be a file that records either events that occur in an operating system or other software runs (e.g., the source code file), or messages between different users of a communication software. The log file may include logs. The source code file may include various source code for a software application. Log adapter 110 may receive the source code and the logs through input module 116. The logs may be from a customer's application runtime execution environment when executing the source code. Log adapter 110 may format the log messages and log caller information, e.g., a caller file name, a method name, a log line etc. Log adapter 110 may receive a pre-defined log rule or pattern. Log adapter 110 may format the log messages and log caller information according to a pre-defined rule or pattern by a user. Log adapter 110 may associate the logs with the source code by the caller file name, the method name, and the log lines. Log adapter 110 may extract variable values per log messages according to code lines. Log adapter 110 may build a map set between source code lines and log lines with variable values. Log adapter 110 may simulate the source code execution with log messages side by side on user interface 118, and with corresponding variable values.

In an example, log adapter 110 may find out a root cause with massive log data collected from an application customer user. For example, when dealing with an issue of an application in a customer environment, an application developer often needs to ask the customer to perform operations to reproduce the issue and collect log data. After the developer receives the log data, it can be difficult for the developer to find out the root cause with the massive log data as sometimes the developer cannot reproduce the issue in a local environment. Log adapter 110 may simulate the software runtime execution by associating the logs with the source code. Log adapter 110 may formatting the logs and associate the logs with the source code by a caller file name and code line information to identify runtime source code paths.

In step 204, log adapter 110 generates log debug information including a log map, a log variable cross reference table, and a method call stack tree, based on the source code received, during a compiling process. Log adapter 110 may generate the log map by lines, e.g., a line mapping table for the log source lines specifically. Log adapter 110 may generate a log variable cross reference table. The log variable cross reference table may include cross reference information for variables in the log source lines. Log adapter 110 may generate a method call stack tree. The method call stack tree may represent the method calls in the source code. Log adapter 110 may generate a mapping set between the source code lines and the logs. Log adapter 110 may generate the log map by lines, the log variables cross reference table, and the method call stack tree during a compiling process.

In step 206, log adapter 110 determines a plurality of log blocks based on log context in the logs and the method call stack tree. Log adapter 110 may identify the plurality of log blocks based on the log context and the method call stack tree. Log adapter 110 may divide the log blocks into separate blocks based on a same log context in each block. Log adapter 110 may break the logs into blocks via the log context and source code call stack to easily find the starting point and narrow down the log scope. Log adapter 110 may break the logs into blocks via log context and a method call stack tree. Log adapter 110 may divide logs into blocks by independent operations implemented in the source code. Log adapter 110 may break the logs into different blocks which may represent different operations. Log adapter 110 may simulate the inputs that map the variable values in the block. For each block, the operation can be interactive, for example, a click on the button of a web page.

In step 208, log adapter 110 maps the source code to the logs for each log block. Log adapter 110 may generate a mapping set with the log blocks. Log adapter 110 may build the mapping set between source code lines and log lines with variable values. For example, log adapter 110 may map from source code to a log mapping set, e.g., from a source file name, a method, and a source code line to a log index. In another example, log adapter 110 may map from a log index to a timestamp, a variable value, and a message with a source file name, a method, and a source code line.

In step 210, log adapter 110 suggests a starting point and a breakpoint based on the log variable cross reference table and the log blocks. Log adapter 110 may present the suggestion of the starting point and the breakpoint based on the log variable cross reference table and the log blocks to a user. For example, when a developer specifies a log block to debug, log adapter 110 may provide a suggestion of some starting points and breakpoints to debug. The developer may confirm the starting points and set the breakpoints accordingly.

In step 212, log adapter 110 compares a source code variable value to a log variable value based on the mapping set between the source code and the logs. Log adapter 110 may compare a debug process path with variables to an execution path with variables from the logs. Log adapter 110 may set a breakpoint intelligently when there is a difference between variable execution paths or values. Log adapter 110 may hack a variable value from the logs for a current debug context. Log adapter 110 may link source code and logs in user interface 118 side by side with context variables from logs. The developer may know exactly what happened in the customer's runtime environment accordingly. Log adapter 110 may extract variable values from log messages according to code lines.

In step 214, log adapter 110 simulates a source code variable value with a log variable value. Log adapter 110 may intelligently debug the source code by comparing the debug process paths and variables with the execution paths and variables from the logs. Log adapter 110 may automatically simulate with variable values from the logs to reproduce the issue. Log adapter 110 may use the variables values from the logs for current debugging context. Log adapter 110 may simulate a customer's environment to reproduce issues for a developer to know what exactly happened in the customer's application runtime execution. Log adapter 110 may compare an application execution between the customer's environment and developer's environment to find out the difference which probably leads to the root cause. Log adapter 110 may simulate the source code execution with log messages side by side on user interface 118 and with corresponding variable values. Log adapter 110 may link the source code to the logs in user interface 118 side by side with context variables from the logs. A developer may debug the source code with same operations as a customer does in the customer's environment. For example, during the debug process, the developer may compare the debug process code paths and variables with the code paths and variables from the logs. The developer may set a break, when there is a difference, e.g., different variable execution paths or values, for the developer to track and may obtain variable values from logs to reproduce issues in the customer's environment.

Figure 3:
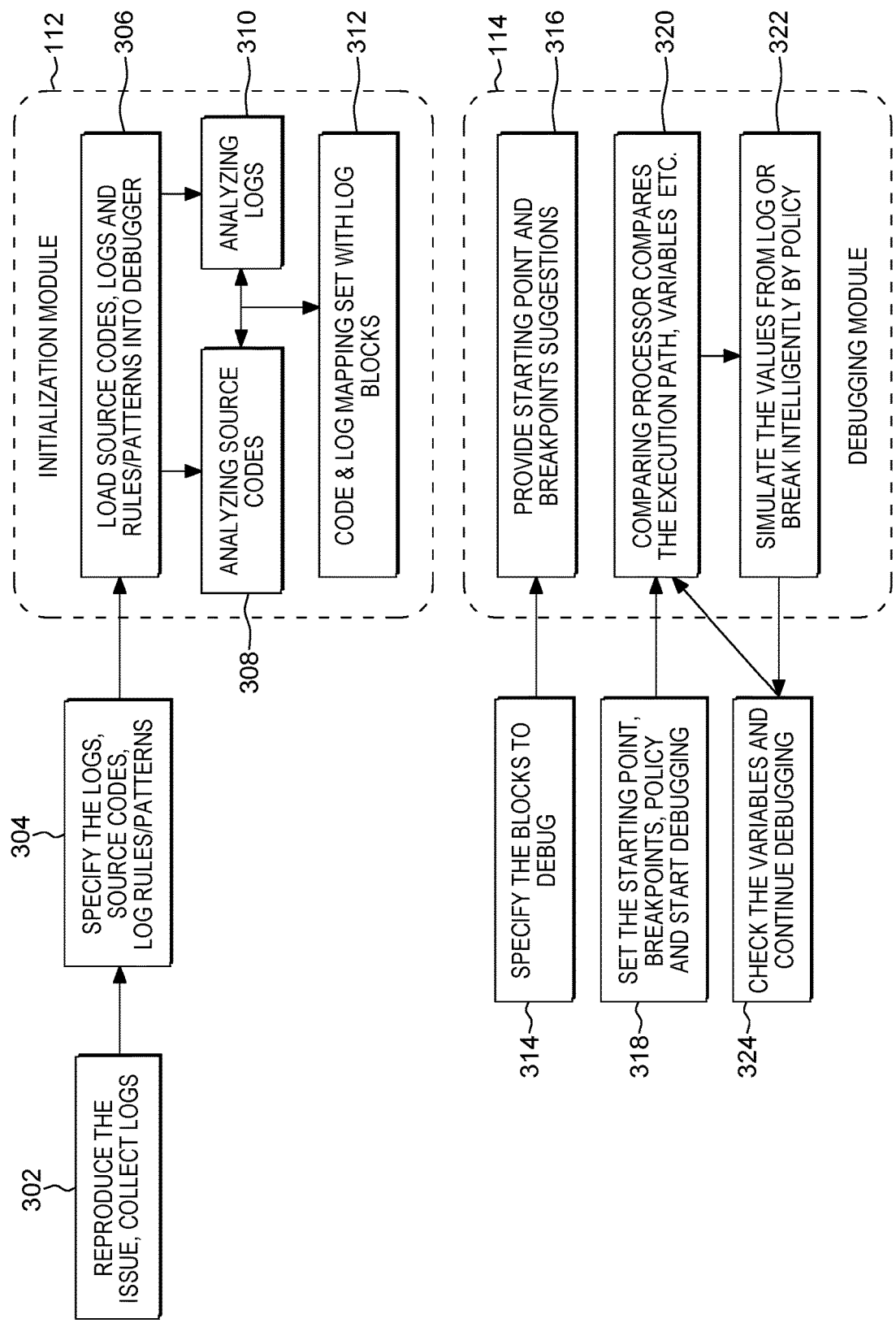
FIG. 3 illustrates an exemplary functional diagram of the log adapter within the computing device of FIG. 1, in accordance with an embodiment of the present disclosure.

FIG. 3 illustrates an exemplary functional diagram of log adapter 110 in accordance with one or more embodiments of the present disclosure.

In the example of FIG. 3, in block 302, a customer may reproduce issues and collect logs for a software application in a customer application environment. In block 304, a developer may specify the logs, source code, and log rules/patterns to debug and analyze the software application in a developer's environment. In block 306, initialization module 112 may load source code, logs, and log rules/patterns in a debugger. In block 308, initialization module 112 may analyze the source code. In block 310, initialization module 112 may analyze the logs. In block 312, initialization module 112 may generate a source code and log mapping set with log blocks. In block 314, a developer may specify a log block to debug. In block 316, debugging module 114 may provide starting point and breakpoint suggestions to the developer to debug the log block. In block 318, the developer may set the starting point and breakpoints to start debugging the source code with the logs in the log block. In block 320, debugging module 114 may compare the debug paths and variables in the debug environment to the execution paths and variables from the logs. In block 324, the developer may check the variables and continue to debug the source code execution. In block 322, debugging module 114 may simulate the variable values from the logs during the debugging process.

Figure 4:
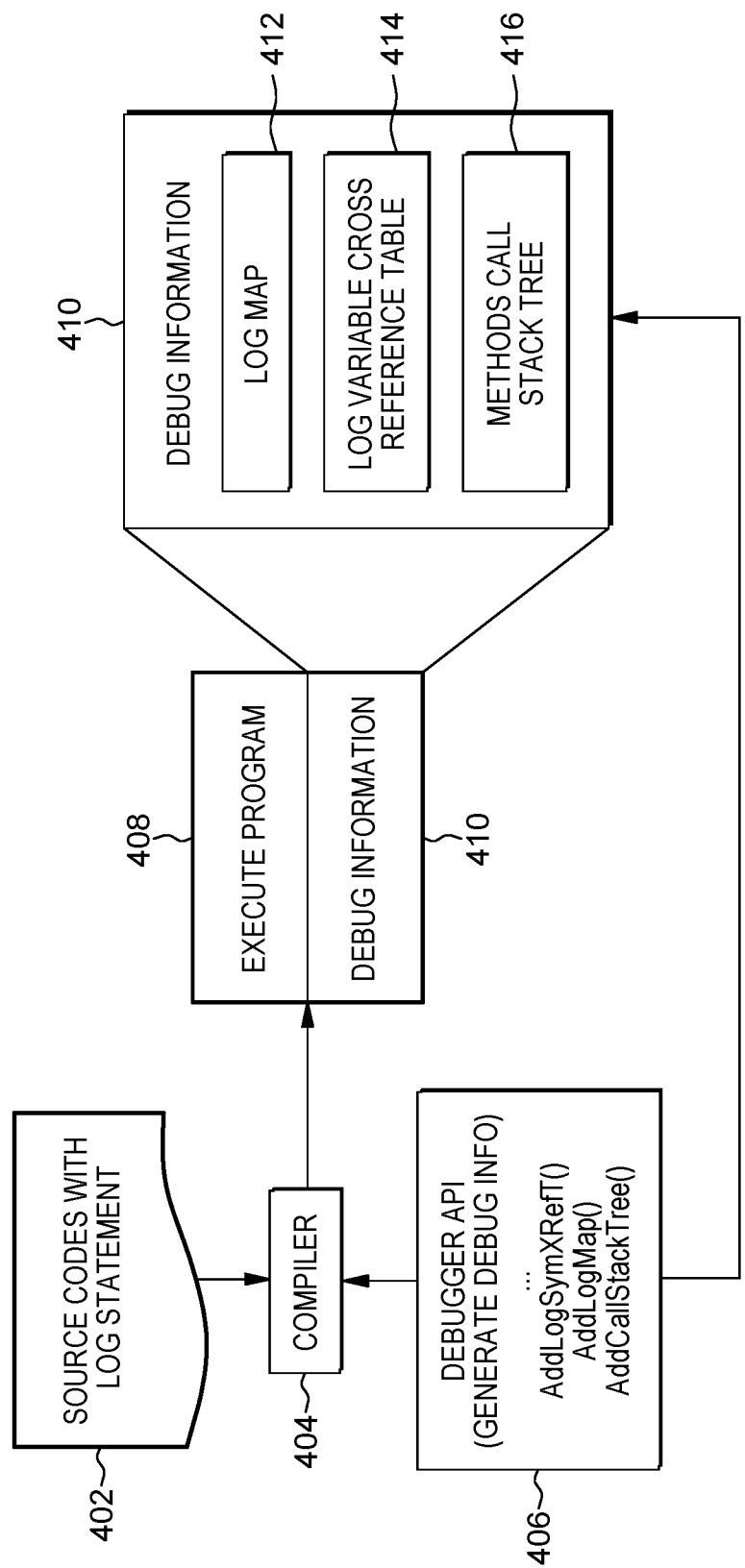
FIG. 4 illustrates an exemplary functional diagram of debug information generation of an initialization module in the log adapter within the computing device of FIG. 1, in accordance with an embodiment of the present disclosure.

FIG. 4 illustrates an exemplary functional diagram of debug information generation 120 of initialization module 112 in log adapter 110 in accordance with one or more embodiments of the present disclosure.

In the example of FIG. 4, log adapter 110 load source code 402 into compiler 404. In block 408, log adapter 110 may execute program of source code 402 in the compiling process. In block 406, debug information generation 120 may generate debug information 410 during the compiling process. Debug information 410 may include log map 412, log variable cross reference table 414, and methods call stack tree 416. Log map 412 may be a line mapping table for the log source lines specifically. Log variable cross reference table 414 may include cross reference information for variables in the log source lines. Method call stack tree 416 may represent the method calls in the source code.

Figure 5:
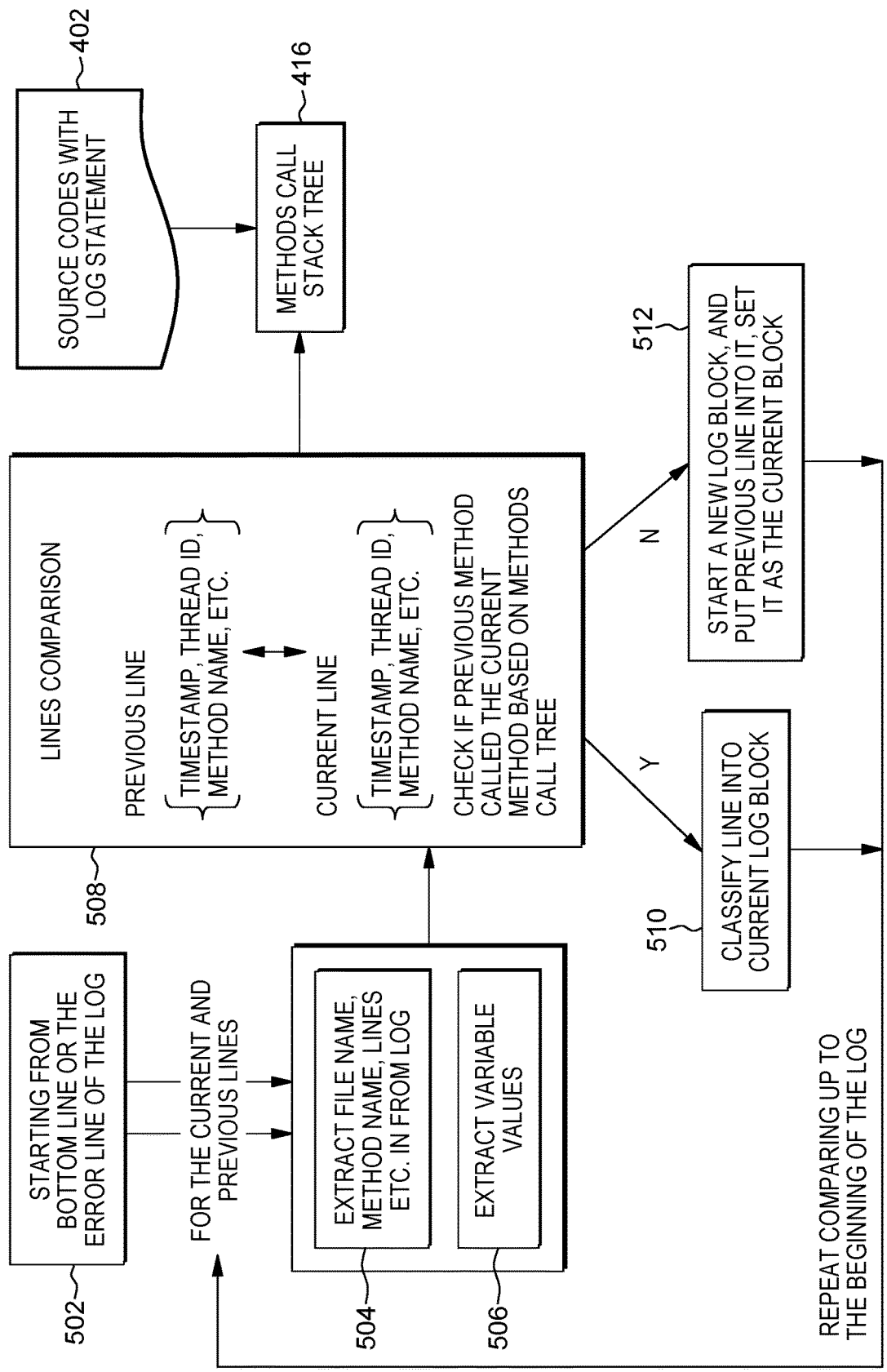
FIG. 5 illustrates an exemplary functional diagram of a block breaking module of the initialization module in the log adapter within the computing device of FIG. 1, in accordance with an embodiment of the present disclosure.

FIG. 5 illustrates an exemplary functional diagram of block breaking module 122 of initialization module 112 in log adapter 110 in accordance with one or more embodiments of the present disclosure.

In the example of FIG. 5, initialization module 112 may determine log blocks based on log context in the logs and method call stack tree 416. Block breaking module 122 may break the logs into blocks via the log context and source code call stack to easily find the starting point and narrow down the log scope. In block 502, initialization module 112 may start to analyze the log context from a bottom line or a line with an error message in the logs. In block 504, initialization module 112 may extract a file name, a method name, and line information from the logs for each current and previous lines in the logs. Initialization module 112 may extract variable values from each current and previous lines in the logs. In block 508, block breaking module 122 may compare each previous line with each current line based on timestamps, thread identities, method names and other suitable information in the logs. Block breaking module 122 may determine whether a previous method calling a current method is within method call stack tree 416. If block breaking module 122 determines that a previous method calling a current method is within method call stack tree 416, in block 510, block breaking module 122 classifies the previous log line into the current log block. If block breaking module 122 determines that a previous method calling a current method is not within method call stack tree 416, in block 512, block breaking module 122 starts a new log block, and classifies the previous log line into the new log block, and sets the new log block as the current log block.

Figure 6:
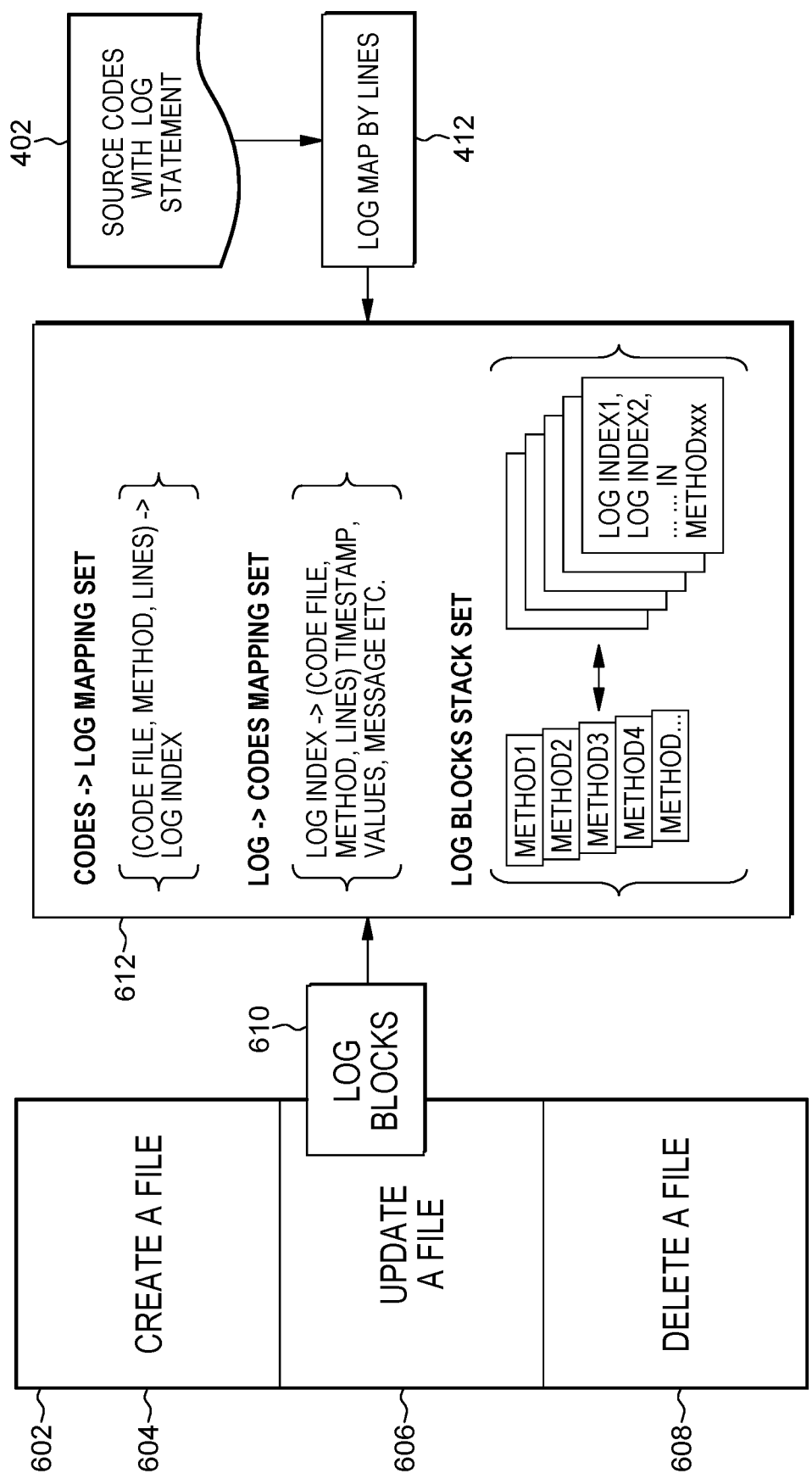
FIG. 6 illustrates an exemplary functional diagram of a mapping module of the initialization module in the log adapter within the computing device of FIG. 1, in accordance with an embodiment of the present disclosure.

FIG. 6 illustrates an exemplary functional diagram of mapping module 124 of initialization module 112 in log adapter 110 in accordance with one or more embodiments of the present disclosure.

In the example of FIG. 6, example logs 602 includes "create a file" block 604, "update a file" block 606, and "delete a file" block 608. Mapping module 124 may map source code 402 to logs 602 for each log block 610. In block 612, mapping module 124 may generate a mapping set with log blocks 610 based on log map 412. Mapping module 124 may build the mapping set between source code lines and log lines with variable values. For example, mapping module 124 may map from source code 402 to a log mapping set, e.g., from a source file name, a method, and a source code line to a log index. In another example, mapping module 124 may map from a log index to a timestamp, a variable value, and a message with a source file name, a method, and a source code line.

Figure 7:
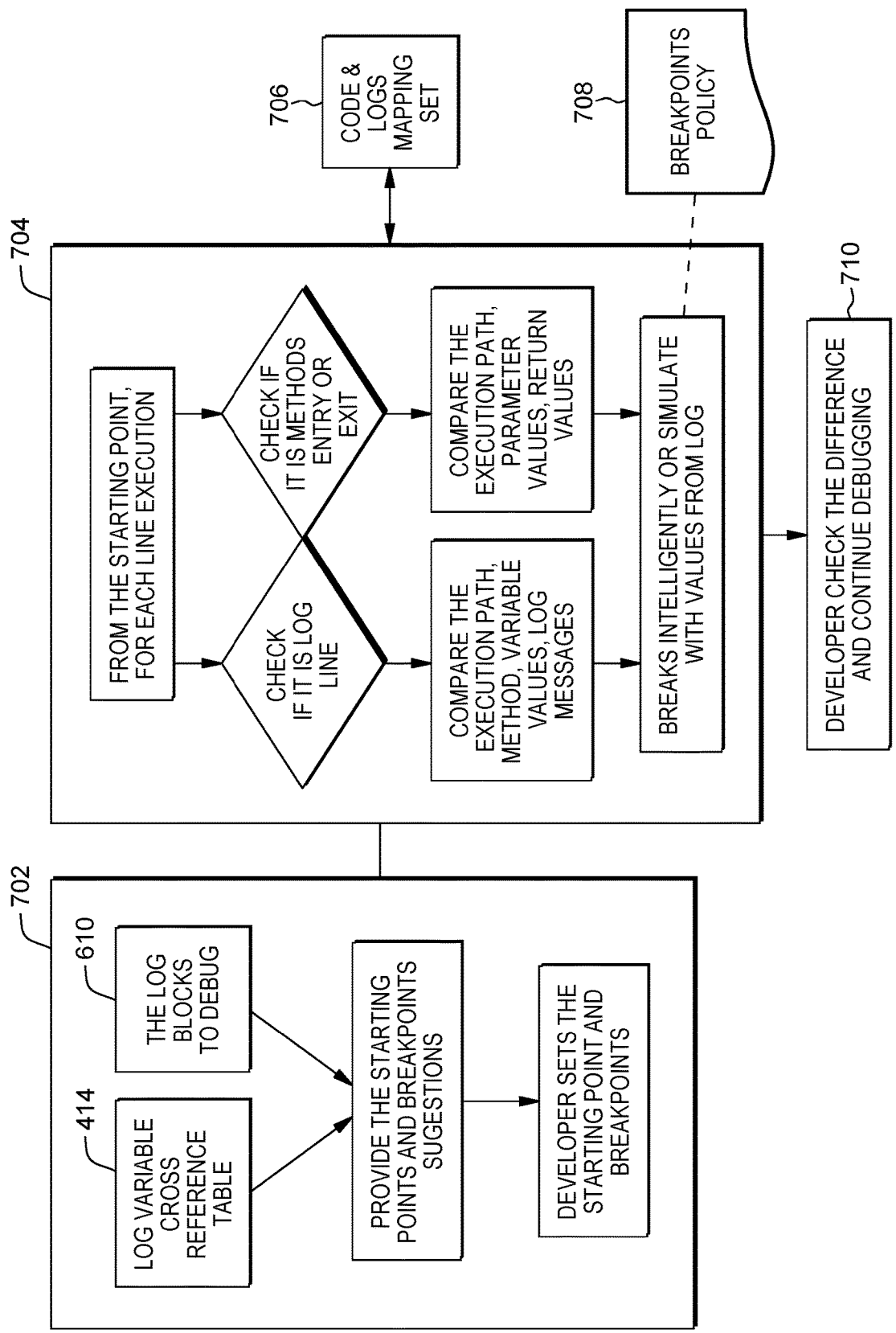
FIG. 7 illustrates an exemplary functional diagram of a debugging module in the log adapter within the computing device of FIG. 1, in accordance with an embodiment of the present disclosure.

FIG. 7 illustrates an exemplary functional diagram of debugging module 114 in log adapter 110 in accordance with one or more embodiments of the present disclosure.

In the example of FIG. 7, in block 702, debugging module 114 may suggest a starting point and a breakpoint based on log variable cross reference table 414 and log blocks 610. Debugging module 114 may present the suggestion of the starting point and the breakpoint to a user, e.g., a developer. For example, when a developer specifies a log block to debug, debugging module 114 may provide a suggestion of some starting points and breakpoints to debug. The developer may set the starting points and breakpoints accordingly. In block 704, comparison module 128 may compare a source code variable value to a log variable value based on code and log mapping set 706 between the source code and the logs. Comparison module 128 may compare a debug process path with variables to an execution path with variables from the logs. Comparison module 128 may set a breakpoint intelligently when there is a difference between variable execution paths or values. Comparison module 128 may set a breakpoint based on pre-defined breakpoint policy 708. In block 710, the developer may check the variables and continue to debug the source code execution.

Figure 8:
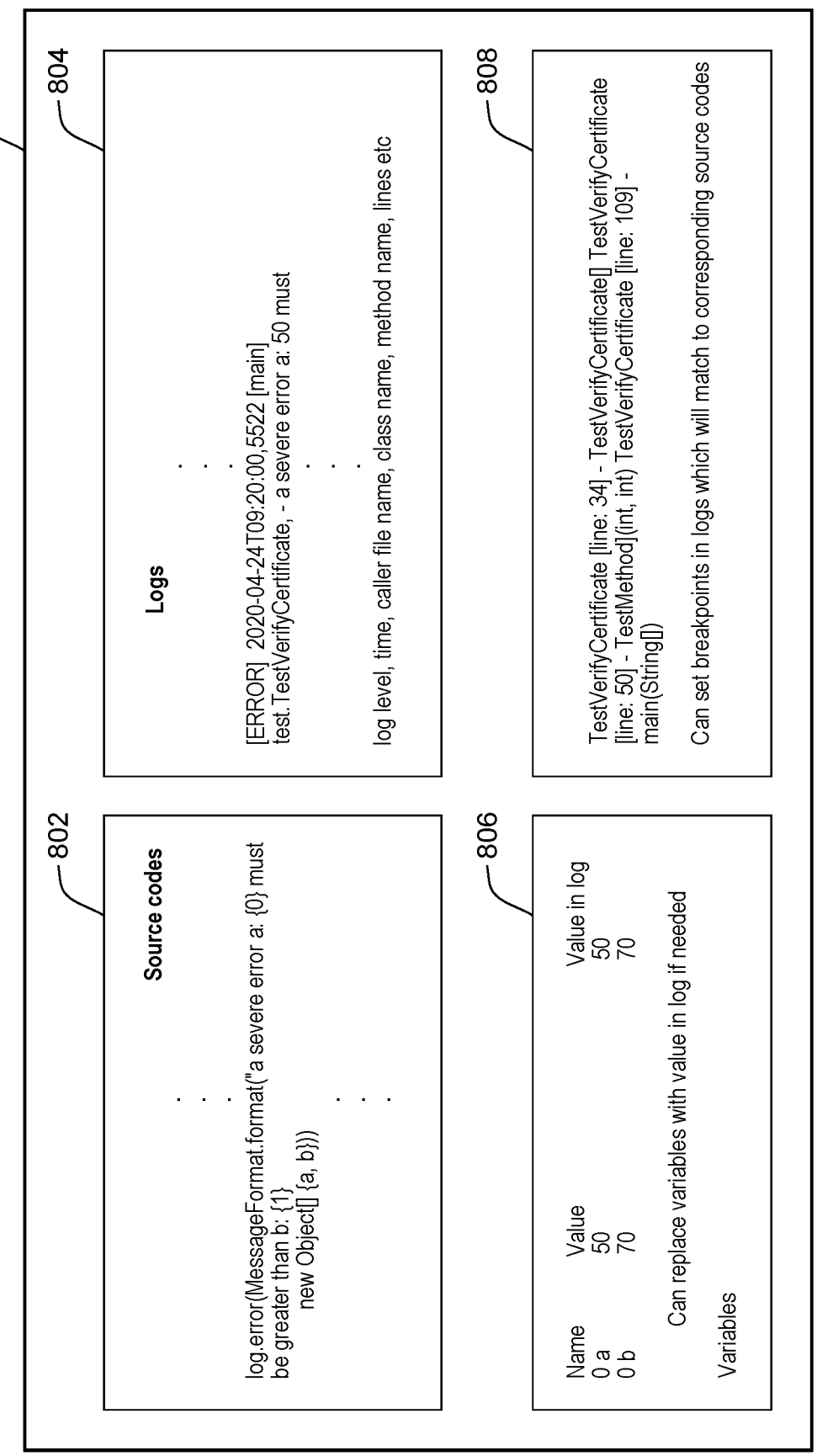
FIG. 8 illustrates an exemplary functional diagram of a user interface in the log adapter within the computing device of FIG. 1, in accordance with an embodiment of the present disclosure.

FIG. 8 illustrates an exemplary functional diagram of user interface 118 in log adapter 110 in accordance with one or more embodiments of the present disclosure.

In the example of FIG. 8, user interface 118 includes source code panel 802, log panel 804, variable panel 806, and breakpoint setting panel 808. Source code panel 802 may display source code. Log panel 804 may display the corresponding logs to the source code. Variable panel 806 is configured to provide a user to replace variables with values in logs if needed. Breakpoint setting panel 808 is configured to set breakpoints in logs which correspond to the source code.

Figure 9:
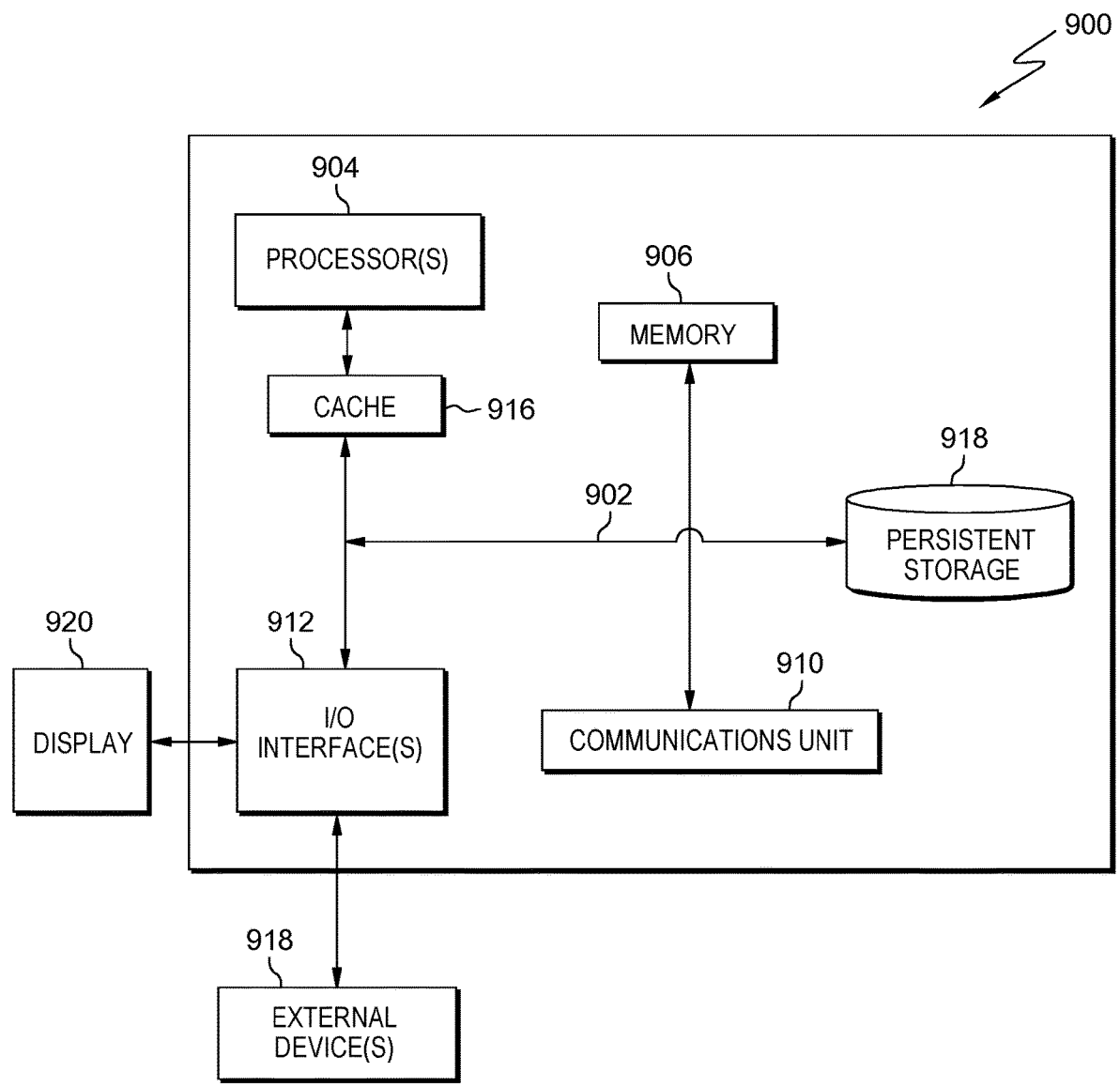
FIG. 9 is a block diagram of components of the computing device of FIG. 1, in accordance with an embodiment of the present disclosure.

FIG. 9 depicts a block diagram 900 of components of computing device 102 in accordance with an illustrative embodiment of the present disclosure. It should be appreciated that FIG. 9 provides only an illustration of one implementation and does not imply any limitations with regard to the environments in which different embodiments may be implemented. Many modifications to the depicted environment may be made.

Computing device 102 may include communications fabric 902, which provides communications between cache 916, memory 906, persistent storage 908, communications unit 910, and input/output (I/O) interface(s) 912. Communications fabric 902 can be implemented with any architecture designed for passing data and/or control information between processors (such as microprocessors, communications and network processors, etc.), system memory, peripheral devices, and any other hardware components within a system. For example, communications fabric 902 can be implemented with one or more buses or a crossbar switch.

Memory 906 and persistent storage 908 are computer readable storage media. In this embodiment, memory 906 includes random access memory (RAM). In general, memory 906 can include any suitable volatile or non-volatile computer readable storage media. Cache 916 is a fast memory that enhances the performance of computer processor(s) 904 by holding recently accessed data, and data near accessed data, from memory 906.

Log adapter 110 may be stored in persistent storage 908 and in memory 906 for execution by one or more of the respective computer processors 904 via cache 916. In an embodiment, persistent storage 908 includes a magnetic hard disk drive. Alternatively, or in addition to a magnetic hard disk drive, persistent storage 908 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 908 may also be removable. For example, a removable hard drive may be used for persistent storage 908. Other examples include optical and magnetic disks, thumb drives, and smart cards that are inserted into a drive for transfer onto another computer readable storage medium that is also part of persistent storage 908.

Communications unit 910, in these examples, provides for communications with other data processing systems or devices. In these examples, communications unit 910 includes one or more network interface cards. Communications unit 910 may provide communications through the use of either or both physical and wireless communications links. Log adapter 110 may be downloaded to persistent storage 908 through communications unit 910.

I/O interface(s) 912 allows for input and output of data with other devices that may be connected to computing device 102. For example, I/O interface 912 may provide a connection to external devices 918 such as a keyboard, keypad, a touch screen, and/or some other suitable input device. External devices 918 can also include portable computer readable storage media such as, for example, thumb drives, portable optical or magnetic disks, and memory cards. Software and data used to practice embodiments of the present invention, e.g., log adapter 110 can be stored on such portable computer readable storage media and can be loaded onto persistent storage 908 via I/O interface(s) 912. I/O interface(s) 912 also connect to display 920.

Display 920 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A computer-implemented method comprising:
   loading, by one or more processors, source code and logs into a debug tool, the logs associated with the source code;
   generating, by one or more processors, log debug information including a log map, a log variable cross reference table, and a method call stack tree, based on the source code;
   determining, by one or more processors, a plurality of log blocks based on log context in the logs and the method call stack tree;
   mapping, by one or more processors, the source code to the logs for each log block;
   suggesting, by one or more processors, a starting point and a breakpoint based on the log variable cross reference table and the log blocks;
   comparing, by one or more processors, a source code variable value to a log variable value and a source code execution path to a log execution path based on the mapping set between the source code and the logs; and
   simulating, by one or more processors, the source code variable value with the log variable value.

2. The computer-implemented method of claim 1, further comprising:
   formatting, by one or more processors, the logs in caller file names, method names, and code lines;
   associating, by one or more processors, the source code with the log messages one by one by the caller file names, the method names, and the code lines;
   extracting, by one or more processors, variables values per the logs according to the code lines; and
   building, by one or more processors, the mapping set between source code lines and log lines with the variable values.

3. The computer-implemented method of claim 1, further comprising:
   setting intelligently, by one or more processors, the breakpoint based on difference of a variable execution path and a breakpoint policy; and
   hacking, by one or more processors, a variable value from the logs for a current debug context.

4. The computer-implemented method of claim 1, wherein each log block is associated to an independent operation or function implemented in the source code.

5. The computer-implemented method of claim 1, wherein mapping the source code to the logs comprises generating the mapping set with each log block.

6. The computer-implemented method of claim 1, further comprising:
   simulating, by one or more processors, the source code execution with the logs with the corresponding variable values on a user interface.

7. The computer-implemented method of claim 1, further comprising:
   linking, by one or more processors, the source code to the logs in a user interface side by side with context variables from the logs.

8. A computer program product comprising:
   one or more computer readable storage media, and program instructions collectively stored on the one or more computer readable storage media, the program instructions comprising:
   program instructions to load source code and logs into a debug tool, the logs associated with the source code;
   program instructions to generate log debug information including a log map, a log variable cross reference table, and a method call stack tree, based on the source code;
   program instructions to determine a plurality of log blocks based on log context in the logs and the method call stack tree;
   program instructions to map the source code to the logs for each log block;
   program instructions to suggest a starting point and a breakpoint based on the log variable cross reference table and the log blocks;
   program instructions to compare a source code variable value to a log variable value and a source code execution path to a log execution path based on the mapping set between the source code and the logs; and
   program instructions to simulate the source code variable value with the log variable value.

9. The computer program product of claim 8, further comprising:
   program instructions to format the logs in caller file names, method names, and code lines;
   program instructions to associate the source code with the log messages one by one by the caller file names, the method names, and the code lines;
   program instructions to extract variables values per the logs according to the code lines; and
   program instructions to build the mapping set between source code lines and log lines with the variable values.

10. The computer program product of claim 8, further comprising:
    program instructions to set intelligently the breakpoint based on difference of a variable execution path and a breakpoint policy; and program instructions to hack a variable value from the logs for a current debug context.

11. The computer program product of claim 8, wherein each log block is associated to an independent operation or function implemented in the source code.

12. The computer program product of claim 8, wherein program instructions to map the source code to the logs comprise program instructions to generate the mapping set with each log block.

13. The computer program product of claim 8, further comprising:
program instructions to simulate the source code execution with the logs with the corresponding variable values on a user interface.

14. The computer program product of claim 8, further comprising:
program instructions to link the source code to the logs in a user interface side by side with context variables from the logs.

15. A computer system comprising:
one or more computer processors, one or more computer readable storage media, and program instructions stored on the one or more computer readable storage media for execution by at least one of the one or more computer processors, the program instructions comprising:
program instructions to load source code and logs into a debug tool, the logs associated with the source code;
program instructions to generate log debug information including a log map, a log variable cross reference table, and a method call stack tree, based on the source code;
program instructions to determine a plurality of log blocks based on log context in the logs and the method call stack tree;
program instructions to map the source code to the logs for each log block;
program instructions to suggest a starting point and a breakpoint based on the log variable cross reference table and the log blocks;
program instructions to compare a source code variable value to a log variable value and a source code execution path to a log execution path based on the mapping set between the source code and the logs; and
program instructions to simulate the source code variable value with the log variable value.

16. The computer system of claim 15, further comprising:
program instructions to format the logs in caller file names, method names, and code lines;
program instructions to associate the source code with the log messages one by one by the caller file names, the method names, and the code lines;
program instructions to extract variables values per the logs according to the code lines; and
program instructions to build the mapping set between source code lines and log lines with the variable values.

17. The computer system of claim 15, further comprising:
program instructions to set intelligently the breakpoint based on difference of a variable execution path and a breakpoint policy; and
program instructions to hack a variable value from the logs for a current debug context.

18. The computer system of claim 15, wherein each log block is associated to an independent operation or function implemented in the source code.

19. The computer system of claim 15, wherein program instructions to map the source code to the logs comprise program instructions to generate the mapping set with each log block.

20. The computer system of claim 15, further comprising:
program instructions to simulate the source code execution with the logs with the corresponding variable values on a user interface.

\* \* \* \* \*